United States Patent
Asakage et al.

(10) Patent No.: US 7,708,100 B2
(45) Date of Patent: May 4, 2010

(54) CONSTRUCTION MACHINERY (75) Inventors: Tomohiko Asakage, Hiroshima (JP);
Norihiko Hayashi, Hiroshima (JP);
Hideki Kinugawa, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 530 days.

(21) Appl. No.: 10/543,108

(22) PCT Filed: Jul. 22, 2003

(86) PCT No.: PCT/JP03/09230

§ 371 (c)(1),
(2), (4) Date: Jul. 22, 2005

(87) PCT Pub. No.: WO2005/008046

PCT Pub. Date: Jan. 27, 2005

(65) Prior Publication Data
US 2006/0144669 A1    Jul. 6, 2006

(51) Int. Cl.
*B60K 28/004* (2006.01)
(52) U.S. Cl. ..................................... 180/272
(58) Field of Classification Search ............... 180/271, 180/272
See application file for complete search history.

(56) References Cited

U.S. PATENT DOCUMENTS

| | | | |
|---|---|---|---|
| 4,381,042 A * | 4/1983 | Perry | 180/272 |
| 5,050,700 A * | 9/1991 | Kim | 180/268 |
| 5,109,945 A * | 5/1992 | Koga | 180/273 |
| 5,425,431 A * | 6/1995 | Brandt et al. | 180/273 |
| 5,931,254 A * | 8/1999 | Loraas et al. | 180/272 |
| 6,030,169 A * | 2/2000 | Rossow et al. | 414/680 |
| 6,189,646 B1 * | 2/2001 | Brandt et al. | 180/273 |
| 6,577,909 B1 * | 6/2003 | McGowan et al. | 700/79 |
| 6,630,749 B1 * | 10/2003 | Takagi et al. | 307/10.7 |
| 2004/0026150 A1 * | 2/2004 | Nishi et al. | 180/272 |
| 2004/0099461 A1 * | 5/2004 | Miiller et al. | 180/272 |
| 2005/0034913 A1 * | 2/2005 | Dahl et al. | 180/272 |

FOREIGN PATENT DOCUMENTS

| | | |
|---|---|---|
| JP | 59-32524 | 2/1984 |
| JP | 4-12135 | 1/1992 |
| JP | 2000-096627 | 4/2000 |
| JP | 2000-318481 | 11/2000 |
| JP | 2001-041069 | 2/2001 |
| JP | 2001-151047 A | 6/2001 |
| JP | 2002-13425 | 1/2002 |
| JP | 2002-303171 | 10/2002 |
| JP | 2003-65097 | 3/2003 |

* cited by examiner

*Primary Examiner*—Paul N. Dickson
*Assistant Examiner*—Timothy Wilhelm
(74) *Attorney, Agent, or Firm*—Oblon, Spivak, McClelland, Maier & Neustadt, L.L.P.

(57) ABSTRACT

After a remote control valve has been brought into a non-working state, a stop signal is to be sent from an engine controller in a controller to a governor controller in an engine to stop the engine automatically, under the condition that an illuminating lamp is turned off, after a preset allowance time has passed and when a gate lever provided at a gateway for an operator is opened (the operator gets off the machine). Further, before the engine is stopped, the operator is to be notified of the coming engine stop, and when the engine is stopped, a power supply is to be cut off automatically.

7 Claims, 9 Drawing Sheets

CONSTRUCTION MACHINERY

TECHNICAL FIELD

The present invention relates to a construction machine in which an engine is adapted to be stopped automatically in a non-working state to save fuel as well as to reduce emissions and noise.

BACKGROUND ART

Conventionally, as a technique of this kind in an excavator and/or a crane, the following techniques have become publicly known:
- (i) as disclosed in Japanese Patent Laid-Open No. 2001-41069, when a gate lever for opening and closing a gateway of a cabin is opened, an engine is to be stopped automatically with the determination, based on a signal from a switch adapted to operate in accordance with the opening of the gate lever, that the operator gets off a machine (i.e. the machine is brought into a non-working state); and
- (ii) as disclosed in Japanese Patent Laid-Open No. 2000-96627, when a lock lever for inoperably locking a hydraulic circuit is operated, the engine is to be stopped automatically with the determination that the machine is brought into a non-working state.

However, based only on apparently optimum conditions for stopping the operation, that is, the opening of the gate lever in the above-described known technique (i), and the operation of the lock lever in the above-described known technique (ii), the engine is stopped immediately without considering other conditions, and no follow-up for engine restart, etc. after the stoppage is provided, which causes the following problems in relation to the engine stop:
- (A) stopping the engine while performing, for example, a checking and/or repairing operation with an illuminating lamp on may lead to over discharge in the case of using a battery as a power supply;
- (B) even though an operator does not intend to stop his/her work, the engine may be stopped unnecessarily; and
- (C) it may take the operator, if not familiar with the system, a long time to restart the engine after an automatic engine stop.

Hence, the present invention has been made to provide a construction machine capable of avoiding the above-described troubles over the automatic engine stop.

To be more concrete, it is an object of the present invention to prevent unnecessary discharge in a machine in which the battery is used as a power supply.

It is another object of the present invention to notify the operator of the coming automatic engine stop to avoid unnecessary engine stop when possible.

It is a further object of the present invention to assist operators unfamiliar with the system to restart the engine.

DISCLOSURE OF THE INVENTION

In order to solve the above-described problems, the present invention employs the following configurations.

The present invention provides a construction machine comprising an illuminating lamp, in which a hydraulic actuator is driven by discharge oil from a hydraulic pump adapted to operate using an engine as a power source, the construction machine including access state detecting means for detecting an access state of getting-on or getting-off of an operator, and control means, the control means being configured to stop the engine automatically, when the access state detecting means detects the getting-off of the operator, under a condition that the illuminating lamp is turned off.

The present invention also provides a construction machine in which a hydraulic actuator is driven by discharge oil from a hydraulic pump adapted to operate using an engine as a power source, the construction machine including access state detecting means for detecting an access state of an operator, and control means, the control means being configured to stop the engine automatically when the access state detecting means detects the getting-off of the operator, and to notify the operator of the coming engine stop before the engine is stopped automatically.

The present invention further provides a construction machine in which a hydraulic actuator is driven by discharge oil from a hydraulic pump adapted to operate using an engine as a power source, the construction machine including access state detecting means for detecting an access state of an operator, and control means, the control means being configured to stop the engine automatically when the access state detecting means detects the getting-off of the operator, and to provide guidance for restarting the engine for an operator when the access state detecting means detects getting-on of the operator after the engine is stopped automatically.

In addition, the present invention provides a construction machine in which a hydraulic actuator is driven by discharge oil from a hydraulic pump adapted to operate using an engine as a power source, the construction machine including access state detecting means for detecting an access state of getting-on or getting-off of an operator, and control means, the control means being configured to stop the engine automatically when the access state detecting means detects the getting-off of the operator, and to cut off a power supply when the engine is stopped automatically.

BEST MODE FOR CARRYING OUT THE INVENTION

First Embodiment (Refer to FIGS. 1 to 7)

Figure 1:
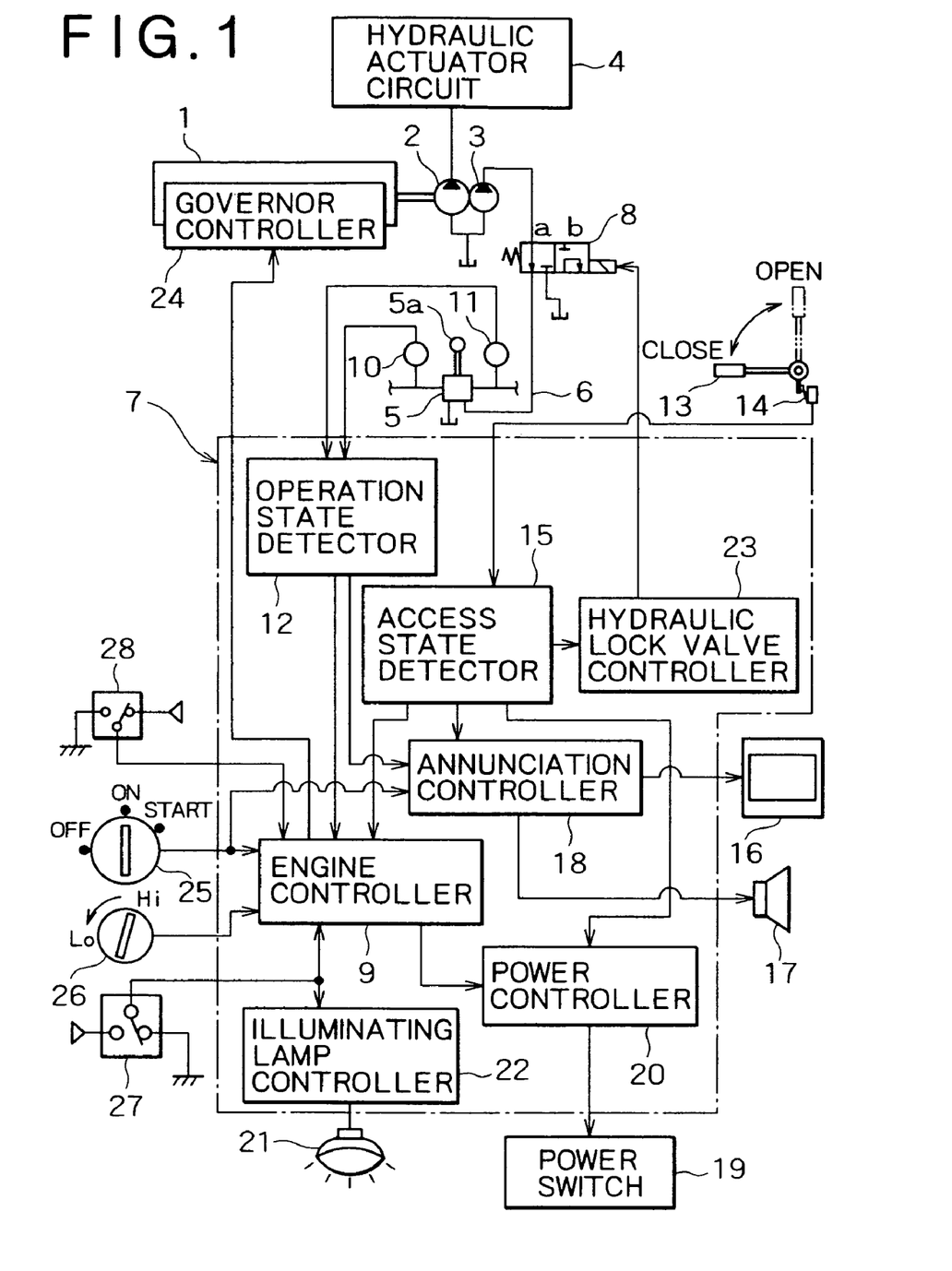
FIG. 1 is a block diagram of a control system of a construction machine according to a first embodiment of the present invention.

FIG. 1 shows the overall configuration of a control system for engine, etc. in a construction machine.

In FIG. 1, reference numeral 1 denotes an engine by which a main hydraulic pump 2 and an auxiliary hydraulic pump 3 are driven so that discharge oil from the main hydraulic pump 2 is supplied to a hydraulic actuator circuit 4, while discharge oil from the auxiliary hydraulic pump 3 to a remote control valve 5 as operating means.

The remote control valve 5 has a lever 5a, and remote control pressure (pilot pressure) according to an operational direction and an operation amount of the lever 5a operates a control valve (not shown) in the hydraulic actuator circuit 4 in a switching manner so that an operational direction and speed of a hydraulic actuator such as a hydraulic cylinder or a hydraulic motor are controlled.

In a remote control valve primary side pipeline 6 for connecting the auxiliary hydraulic pump 3 and the remote control valve 5 with each other is provided a hydraulic lock valve (solenoid valve) 8 to be controlled by a controller 7 as control means, where switching the hydraulic lock valve 8, as shown in the figure, from an opened position "a" to a locked position "b" on the right side stops supplying pilot pressure oil to the remote control valve 5.

Thus, since no remote control pressure is generated even if the remote control valve 5 is operated, an operation of the hydraulic actuator circuit 4 is to be stopped.

In the controller 7 are mainly included an engine controller 9 for controlling running/stopping and speed or rotational number of the engine 1, an operation state detector 12 for detecting whether or not the remote control valve 5 is operated (i.e. the working state of the remote control valve 5) based on signals from pressure sensors 10 and 11 provided in the remote control valve 5, an access state detector 15 for detecting an access state of the operator based on a signal from a gate lever switch 14 adapted to be turned on when a gate lever 13 provided at a gateway of a cabin is operated from the closed state indicated by the solid line in the figure to the opened state indicated by the broken line (i.e. the operator gets off the machine), an annunciation controller 18 for controlling a display device 16 and a speaker 17 as annunciation means for notifying of the coming engine stop and for providing guidance for restarting the engine, a power controller 20 for controlling a power switch 19 to be turned on and off, an illuminating lamp controller 22 for controlling an illuminating lamp 21, and a hydraulic lock valve controller 23 for controlling the hydraulic lock valve 8 based on a signal from the access state detector 15 (i.e. for switching the hydraulic lock valve 8 to the locked position "b" when the operator gets off the machine).

Reference numeral 24 denotes a governor controller for setting the running/stopping and the speed of the engine 1 based on a signal from the engine controller 9 in the controller 7, reference numeral 25 a key switch for starting the engine, reference numeral 26 an engine throttle for setting the engine speed, reference numeral 27 an illuminating lamp switch for turning the illuminating lamp 21 on and off, and reference numeral 28 a selection switch for selecting, based on an intention of the operator, whether or not to perform an automatic control to be described hereinafter.

The operation of the construction machine, including control contents by the controller 7, will be described with reference to FIGS. 2 to 7.

(A) Engine Stop Control

Figure 2:
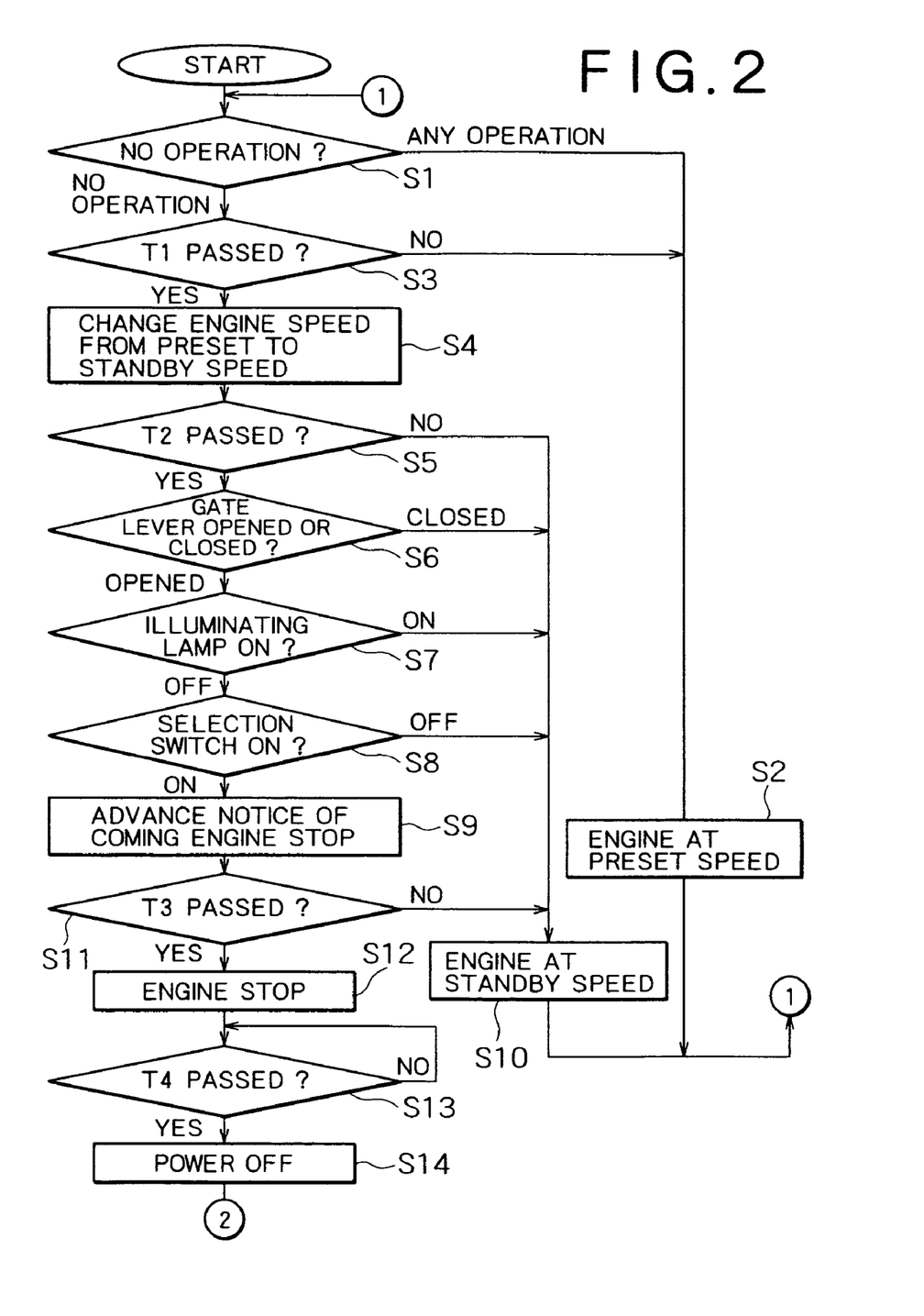
FIG. 2 is a flow chart for an engine stop and power supply cut-off control, illustrating an operation according to the first embodiment.

FIG. 2 shows a flow for an engine stop control, in which the operation state detector 12 determines whether or not the remote control valve 5 is operated when the control is started (Step S1), and in the case of YES (i.e. there is any operation), the engine 1 is to be operated at a preset speed using a signal from the engine controller 9 to the governor controller 24 based on an input from the engine throttle 26 (Step S2).

Meanwhile, in the case of NO (i.e. there is no operation) in Step S1, after a preset waiting time T1 has passed (Step S3), the engine is to be decelerated down to a standby speed which is preset as a low speed leading to engine stop (Step S4).

Then, a preset allowance time T2 is counted, and after the allowance time T2 has passed (in the case of YES in Step S5), it is determined, respectively, whether or not the gate lever 13 is in the "open" position in Step S6, whether or not the illuminating lamp 21 is turned on in Step S7, and whether or not the selection switch 28 is in an "automatic control" state in Step S8, and in the case of YES for all the determinations, a notification of the coming engine stop (e.g. "The engine will be stopped automatically") is to be given through the display device 16 or the speaker 17 in Step S9.

It is noted that in the case where the time T2 has not yet passed in Step S5, the gate lever is in the "close" position in Step S6, the illuminating lamp is turned on in Step S7, or the selection switch is turned off in Step S8, the engine is to be kept at the standby speed in Step S10.

Then, after an engine stop waiting time T3, which is set as required between a notification of the coming engine stop and the actual stopping of the engine 1, has passed (in the case of YES in Step S11), the engine 1 is to be stopped automatically (Step S12).

Further, after the engine stop and after a preset waiting time T4 has passed (Step S13), the power supply is to be cut off (Step S14).

As mentioned above, while performing, for example, a checking and/or repairing operation with the illuminating lamp 21 on, the engine 1 is not to be stopped even when the other conditions for stopping the engine are met, which prevents over discharge of a battery if used as a power supply.

Figure 4:
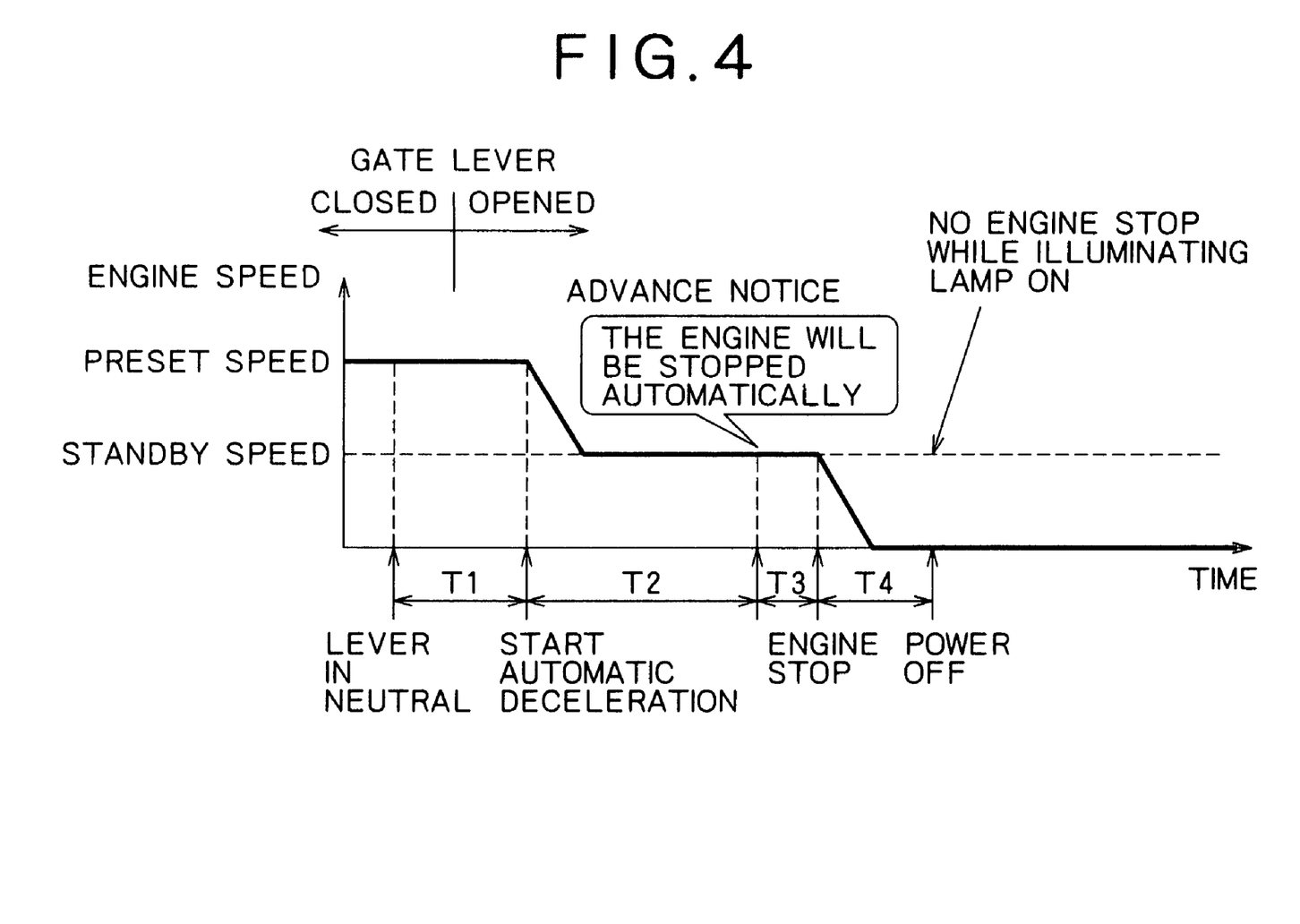
FIG. 4 is a timing diagram for an engine stop control in the case where a gate lever is operated to be in an "open" position before an allowance time passes.
Figure 5:
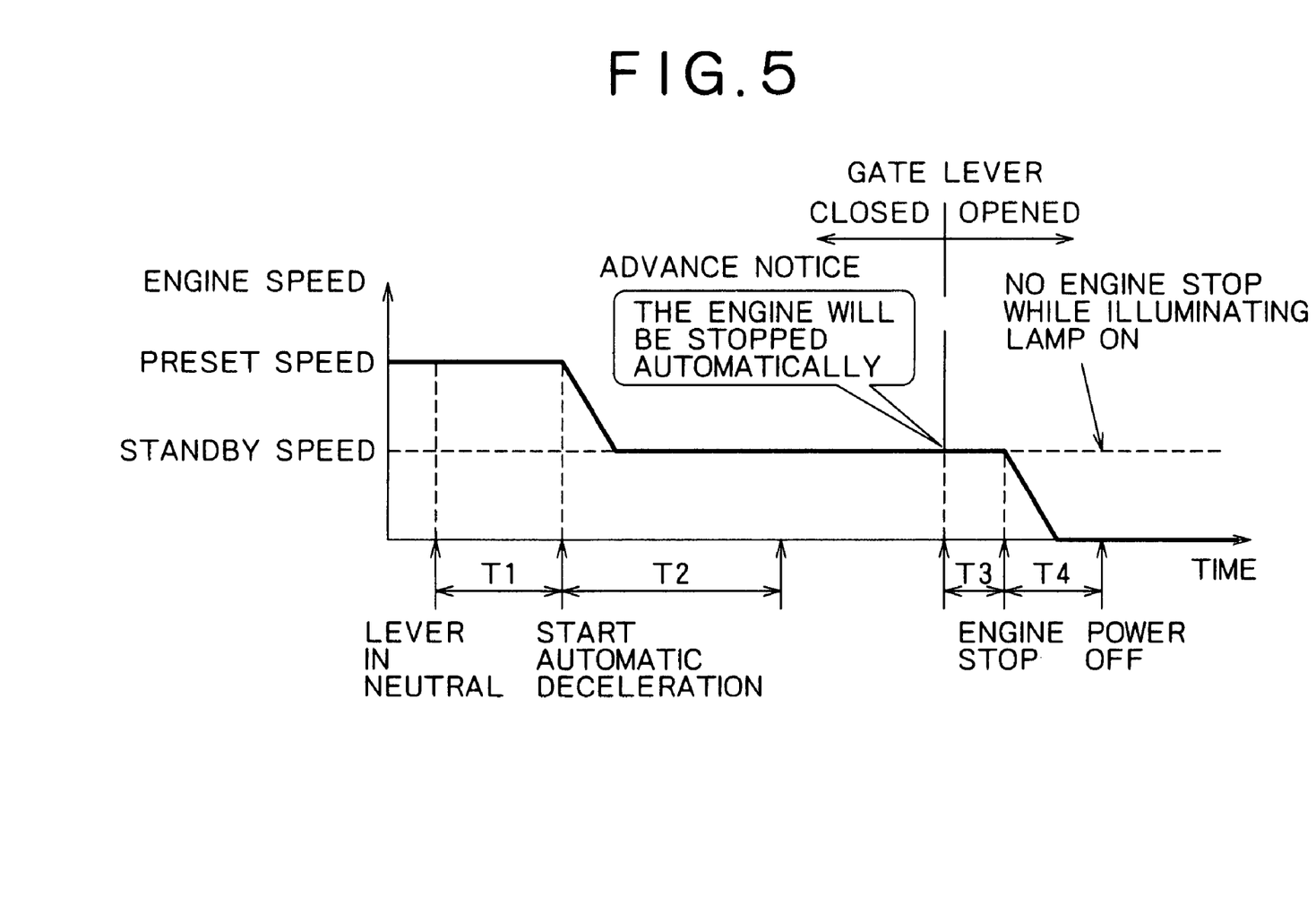
FIG. 5 is a timing diagram for an engine stop control in the case where the gate lever is operated to be in the "open" position after the allowance time has passed.

The above-described operations are also shown in the timing diagrams in FIGS. 4 and 5.

FIG. 4 shows the case where after it has been detected, in Step S1 in FIG. 2, that there is no operation, the gate lever 13 is opened (i.e. the operator gets off the machine) before the allowance time T2 in Step S5 in FIG. 2 passes, where after the gate lever 13 is opened, the engine 1 is to be stopped after the allowance time 2 and the engine stop waiting time T3 have passed.

On the contrary, FIG. 5 shows the case where after it has been detected that there is no operation, the gate lever 13 is opened after the allowance time T2 has passed, where since the two conditions are not met during the allowance time T2, the engine 1 is not to be stopped even after the allowance time T2 has passed, and subsequently, when the gate lever 13 is opened, the engine 1 is to be stopped only after the engine stop waiting time T3 has passed.

As mentioned above, after the remote control valve 5 is brought into a non-working state, the engine 1 is to be stopped automatically after the allowance time T2 has passed and when the operator gets off the machine (i.e. the gate lever 13 in the "open" position), that is, only when it is clear that the operator intends to stop his/her work.

Therefore, if the operator intends to continue his/her work, the engine 1 is not to be stopped even when the work is stopped while, for example, the operator gives work instructions and/or signs or confirms work contents outward from inside the cabin. The engine 1 is also not to be stopped even when the operator gets off the machine temporarily to have a wash or make a configuration for a short time, under the condition that the operator is to get on the machine again during the allowance time T2.

Thus, there is no possibility that the engine 1 may be stopped despite the intention of the operator, which allows a burden of restarting the engine 1 after each stop to be removed.

In addition, thus providing the allowance time T2 allows the operator to get around to selecting intention whether to continue or stop his/her work.

There can further be obtained the following effects.

(i) Since the engine 1 is operated at a lower speed (standby speed) during the allowance time T2 as shown in FIGS. 2 and 4, it is possible to reduce the waste of engine fuel.

(ii) Since before the engine 1 is stopped automatically, the operator is notified of the coming engine stop, the operator intending to get off the machine is allowed to finally select whether to stop or continue the engine (work), which allows unnecessary engine stop to be avoided.

(iii) Since the power supply is cut off automatically when the engine is stopped, it is also possible to stop the electrical system to ensure safety, and to prevent unnecessary discharge when using a battery as a power supply.

In addition, since the power supply is to be cut off after affixed waiting time T4 has passed since the engine is stopped, it is possible to ensure electrical treatments that should be performed when the engine is stopped (e.g. memory processing in a machine with a computer mounted thereon).

(B) Engine Restart Control

Figure 3:
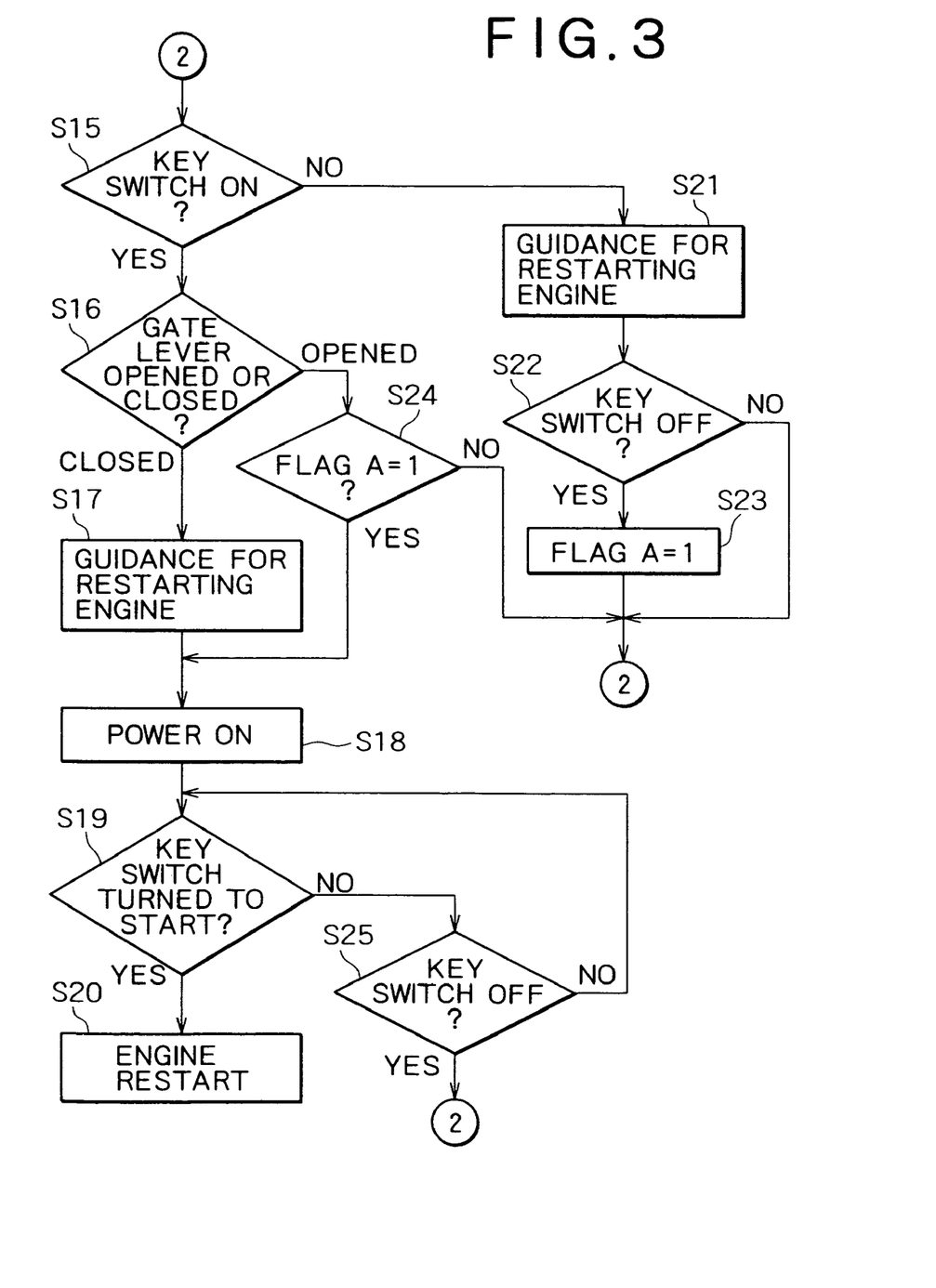
FIG. 3 is a flow chart for an engine restart and power supply connection control, illustrating the operation according to the first embodiment.

FIG. 3 shows a flow for an engine restart control, in which it is first determined whether or not the key switch 25 is in the ON position in Step S15.

If the engine 1 is stopped automatically through the above-described engine stop control, the key switch 25 is in the ON position, but then may be left continuously in the ON position or may be turned off by the operator and a key is to be removed.

Hence, in the case of YES in Step S15 after the engine is stopped, it is determined whether the gate lever 13 is in the "open" or "close" position in Step S16. In the case of "close", guidance for restarting the engine (e.g. literal notation or audio guidance of "Turn the key switch to restart the engine") is to be provided for the operator through the display device 16 or the speaker 17 in Step S17 with the determination that the operator gets on the machine.

Next, after the power supply is recovered in Step S18, it is determined whether or not the key switch 25 is turned to start in Step S19, and in the case of YES, the engine 1 is to be restarted (Step S20).

Meanwhile, in the case of NO in Step S15, that is, it is determined that the key switch 25 is not in the ON position, guidance for restarting the engine is to be provided in Step S21 as is the case in Step S17. Then it is determined, in Step S22, whether or not the key switch 25 is once turned off in accordance with the guidance, and in the case of YES (i.e. being turned off), the flag A=1, which indicates that the key switch 25 is once turned off, is stored in Step S23, and then the processing flow returns to Step S15.

It is noted that in the case of NO (i.e. the key switch 25 is not turned off) in Step S22, the processing flow also returns to Step S15 to repeat Steps S21 and S22.

Further, in the case of the gate lever being in the "open" position in Step S16, it is determined, in Step S24, whether or not the flag A is equal to 1, that is, the key switch 25 is once turned off. In the case of YES, the power supply is to be connected (Step S18) with the determination that the operator performs a restart operation with the gate lever 13 opened, which allows the engine to be restarted (Step S20).

On the contrary, in the case of NO in Step S24, the processing flow returns to Step S15 with the determination that the operator does not operate the key switch.

Meanwhile, in the case of NO (i.e. the key switch 25 is not turned to start) in Step S19, it is determined whether or not the key switch 25 is in the OFF position in Step S25, and in the case of NO, the processing flow returns to Step S19 to wait until the key switch is turned to start, while in the case of YES, the processing flow returns to Step S15 to wait until the key switch is operated to be in the ON position.

Figure 6:
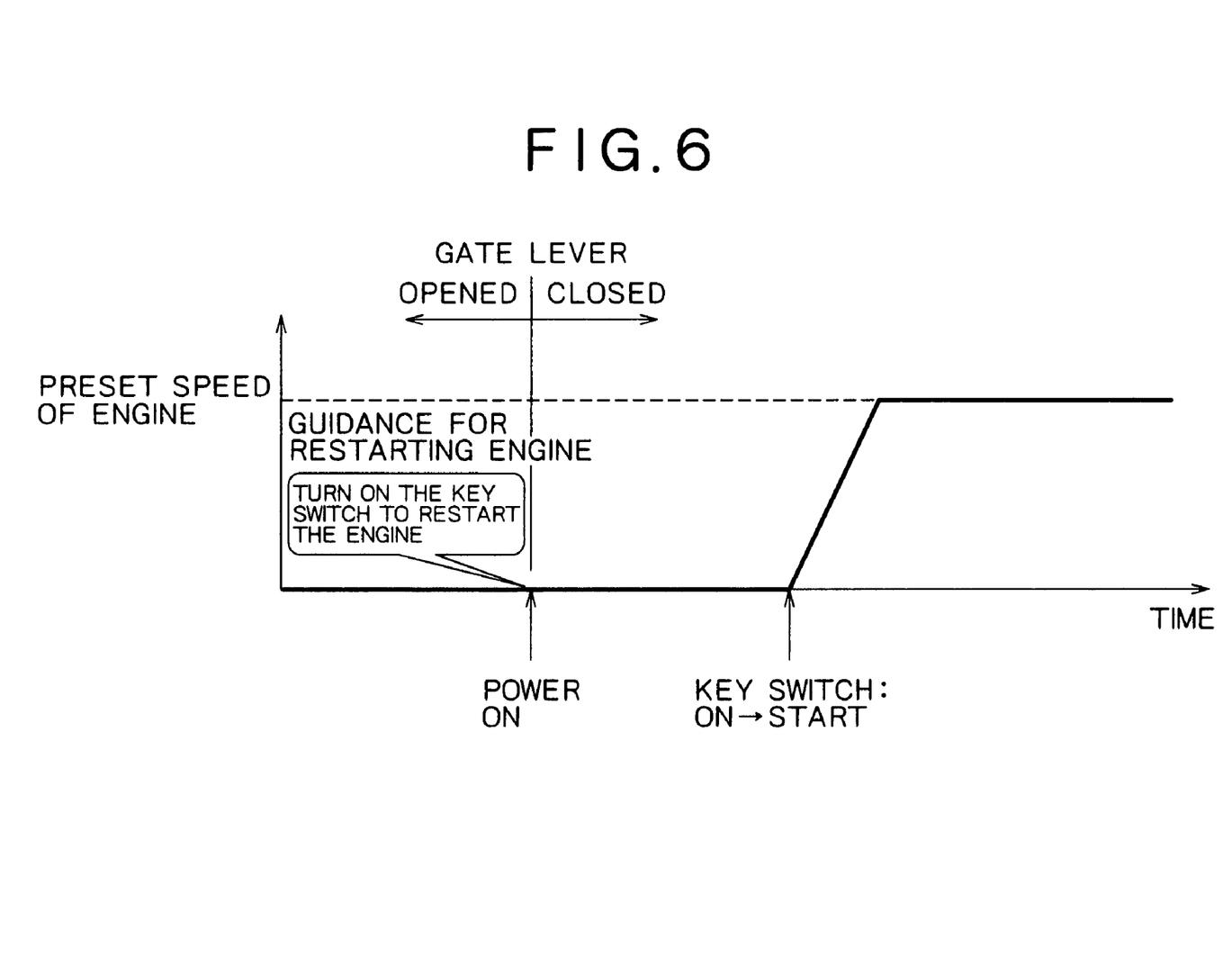
FIG. 6 is a timing diagram for an engine restart control in the case where the gate lever is operated prior to a key switch.

FIG. 6 is a timing diagram for an engine restart control in the case where the gate lever 13 is operated to be in the "close" position prior to the key switch 25, in which when the gate lever 13 is operated to be in the "close" position, the power supply is to be recovered, and when the key switch 25 is turned to start, the engine 1 is to be operated.

Figure 7:
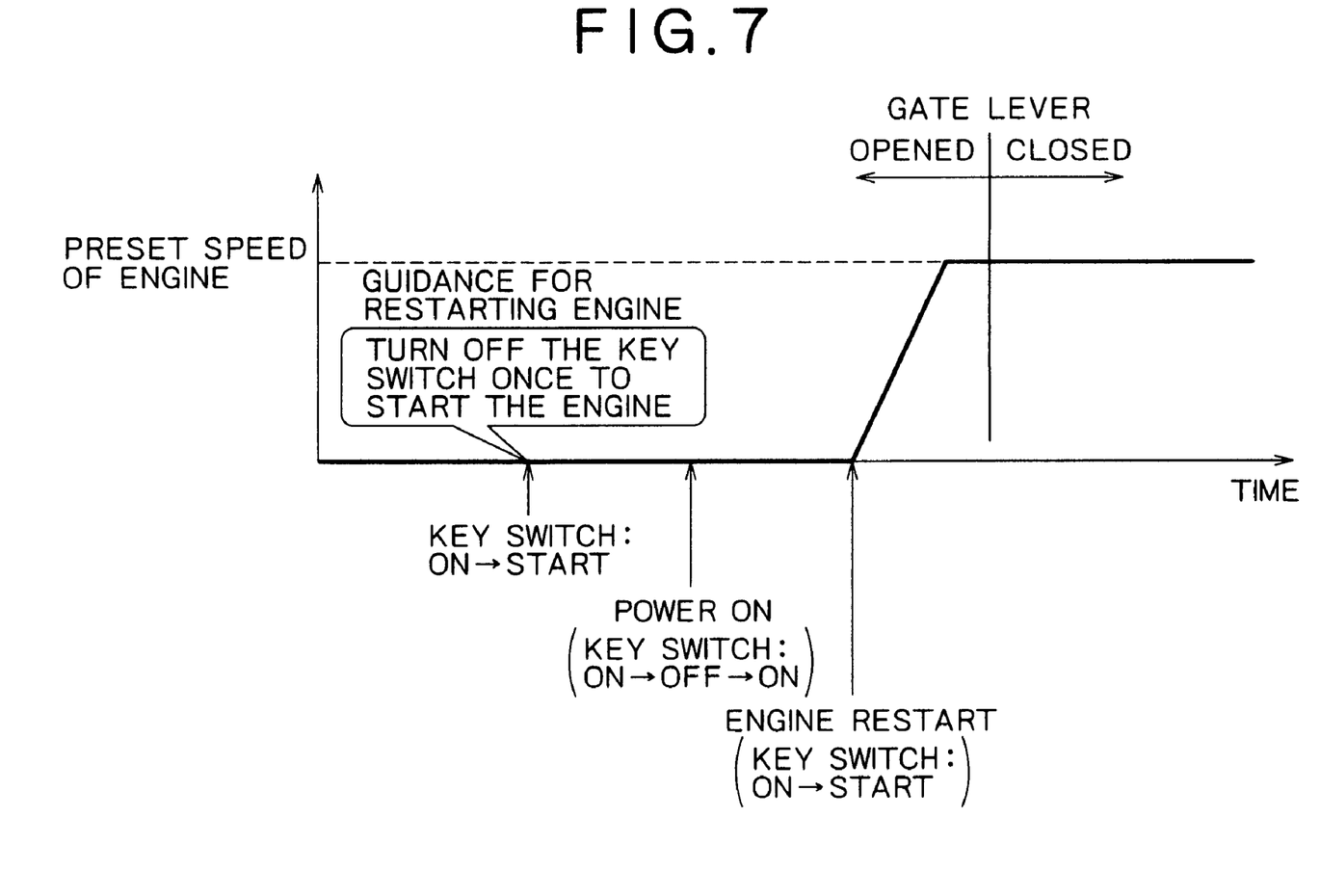
FIG. 7 is a timing diagram for an engine restart control in the case where the key switch is operated prior to the gate lever.

Meanwhile, FIG. 7 is a timing diagram for an engine restart control in the case where the key switch 25 is operated before the gate lever 13 is operated to be in the "close" position (i.e. an operator gets on the machine and then performs a restart operation before he/she operates the gate lever 13 to be in the "close" position), in which when the key switch 25 is operated from the ON to OFF position or is turned to start as mentioned above, guidance for restarting the engine is to be provided, and when the key switch 25 is operated from the OFF to ON position, the power supply is to be recovered, and further when the key switch 25 is turned to start from the ON position, the engine 1 is to be restarted.

As mentioned above, in order to allow the power supply to be recovered after the engine is stopped, it is only required that the operator gets on the machine (Steps S16 to S18), which requires no burdensome procedure for recovering the power supply to be followed, resulting in a reduction in the operational burden of the operator.

Further, the power supply is also to be recovered on the confirmation, based on the flow from Step S15 through Steps S21 to S23 to again Step S15 whereby the key switch 25 is turned from the ON position back to the OFF position, and then to the ON position again, that the operator intends to restart the engine, whereby there is no possibility that the power supply may be recovered unnecessarily.

Meanwhile, guidance for restarting the engine is to be provided for an operator in each of the following cases:
(a) the operator gets on the machine (in the case of "close" in Step S16); and
(b) the key switch 25 is operated from the ON position to another position (in the case of NO in Step S15),
whereby the operator, even if unfamiliar with the system, can operate the machine without question, which allows the engine 1 to be restarted quickly and smoothly.

Figure 8:
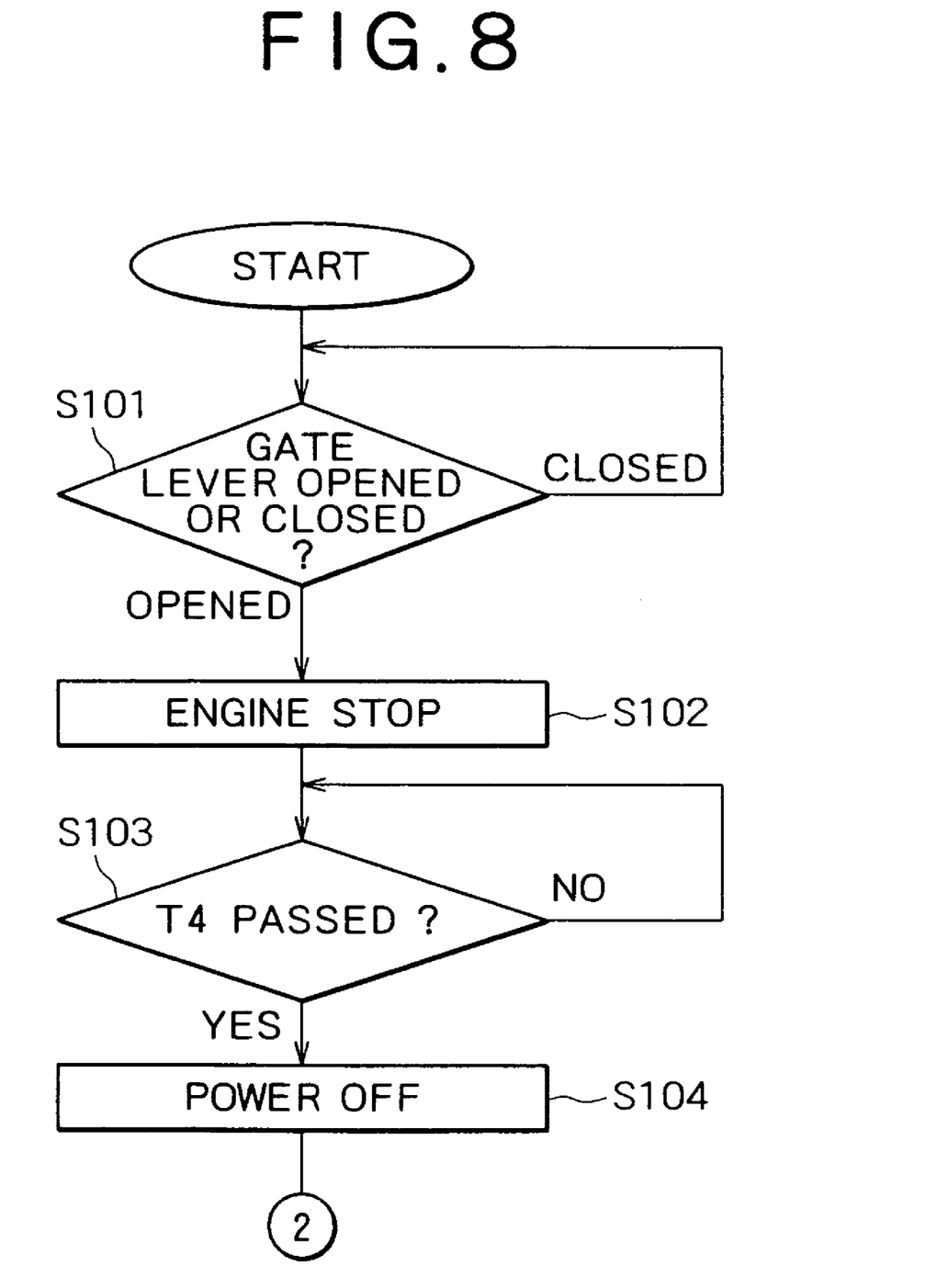
FIG. 8 is a flow chart for an engine stop and power supply cut-off control, illustrating an operation according to a second embodiment of the present invention.
Figure 9:
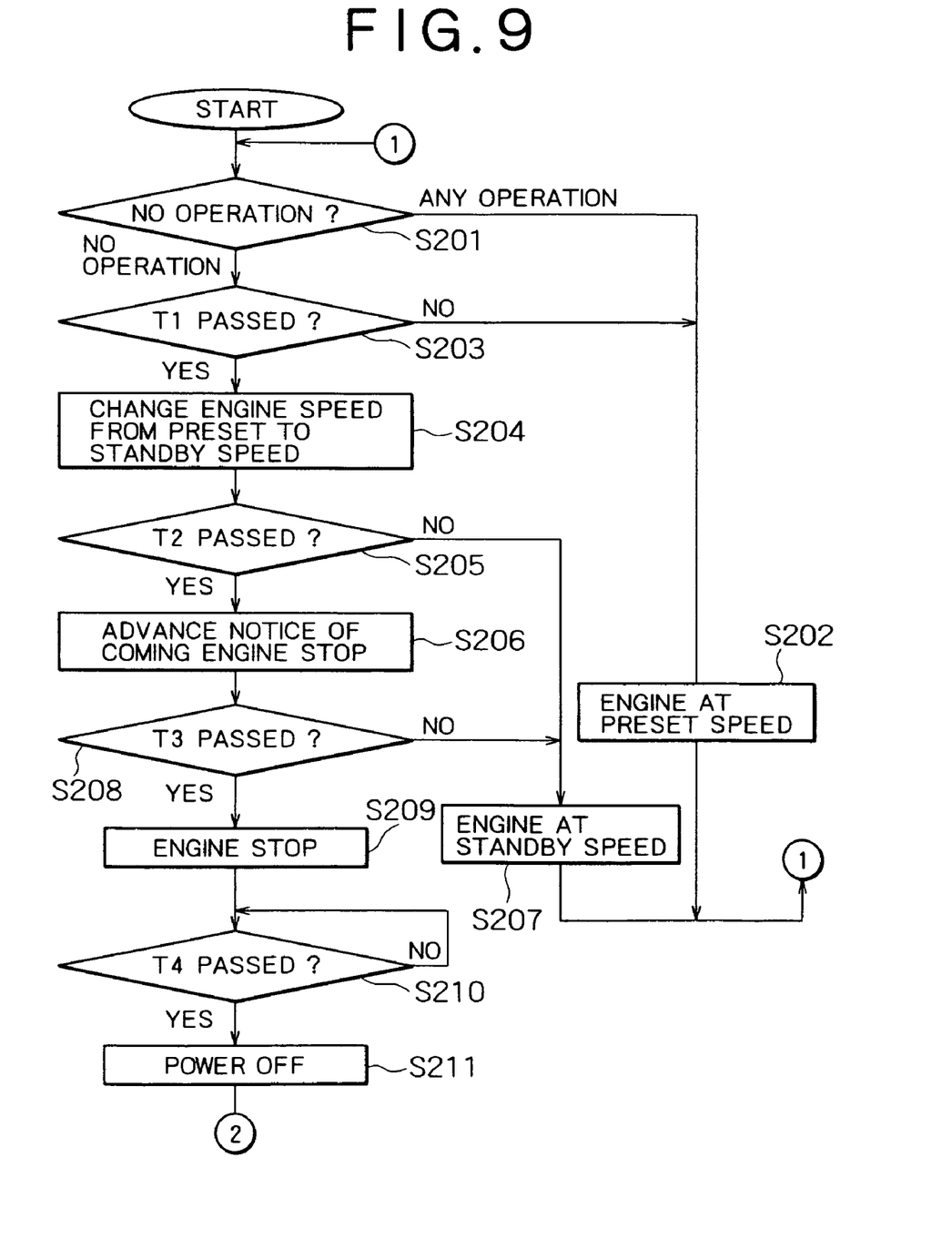
FIG. 9 is a flow chart for an engine stop and power supply cut-off control, illustrating an operation according to a third embodiment of the present invention.

Second and Third Embodiments (Refer to FIGS. 8 and 9)

Although the first embodiment is configured in such a manner that after the allowance time T2 has passed since the valve is brought into a non-working state and when the gate lever 13 is operated to be in the "open" position, the engine 1 is to be stopped automatically and the power supply is to be cut off, the second embodiment is configured in such a manner, as shown in FIG. 8, that the engine 1 is to be stopped automatically under the only condition that the gate lever 13 is operated to be in the "open" position (Steps S101 and S102), and that after the waiting time T4 has passed (Step S103), the power supply is to be cut off (Step S104).

The third embodiment shown in FIG. 9 is also configured in such a manner that it is determined whether there is no operation in Step S201 (in the case where there is any operation, the processing flow goes to Step S202), and in the case where there is no operation, after the waiting time T1 has passed, the engine is to be decelerated down to a standby speed (Steps S203 and S204), and further after the allowance time T2 has passed in Step S205 (before the time passes, the processing flow goes to Step S207), a notification of the coming engine stop is to be given (Step S206) and then the engine 1 is to be stopped automatically (Step S208), and subsequently, after the waiting time T4 has passed, the power supply is to be cut off (Step S211).

Further, in the second and third embodiments, since the power supply is cut off when the engine is stopped, there can also be obtained the effects, as is the case in the first embodiment, that it is possible to prevent over discharge of a battery if used as a power supply in a machine, and that it is also possible to stop the electrical system to ensure safety.

Other Embodiments (1) It may be configured in such a manner that the allowance time T2 for the engine stop can be lengthened or shortened for each machine in accordance with operator's preference, working environment, etc.

It may also be configured in such a manner that the engine is not decelerated down to the standby speed, but is kept at the preset speed during the allowance time T2.

(2) Although the foregoing embodiments are configured in such a manner that the engine 1 is not to be stopped automatically while the illuminating lamp 21 on, it may be configured in such a manner that the engine 1 is to be stopped automatically while the illuminating lamp on.

It may also be configured in such a manner that it is possible to arbitrarily select between the two patterns (the engine is to be stopped/not to be stopped while the illuminating lamp on) by means of a selector switch.

(3) It may be configured in such a manner that the access state detecting means employs a system in which an access of an operator is detected directly by means of a weight sensor, a light sensor, etc., instead of the above-described system in which the access of an operator is detected indirectly through the opening and closing operation of the gate lever 13.

(4) It may be configured in such a manner that the operation state detecting means employs a system in which a pressure switch, a limit switch, a micro switch, or an optoelectronic switch, etc. adapted to operate when the remote control valve 5 is operated by an operator is used, instead of the above-described system in which the remote control pressure of the remote control valve 5 is detected.

INDUSTRIAL APPLICABILITY

As described heretofore, in accordance with the present invention, although the engine is stopped automatically under the basic condition that the operator gets off the machine, adding conditions to the automatic engine stop, giving a notification of the coming engine stop, cutting off and connecting the power supply, respectively, when the engine is stopped and restarted, or assisting the restarting of the engine once stopped allows troubles accompanied with engine stop to be avoided.

That is, even if the operator may get off the machine, the engine is not to be stopped automatically while the illuminating lamp on, which allows over discharge of a battery if used as a power supply to be prevented.

Further, since before the engine is stopped automatically, the operator is notified of the coming engine stop, the operator intending to get off the machine is allowed to become aware of the coming engine stop and finally to select whether to stop or continue the work, which allows unnecessary engine stop to be avoided when possible.

Further, after the engine is stopped automatically, when an operator gets on the machine again, or when the operation of the key switch for restarting the engine (i.e. the operation in which the key switch in the ON position is turned once back to the OFF position, and then turned to the START position through the ON position, or the key switch is turned from the ON position directly to the START position) is performed, guidance for restarting the engine is to be provided with the determination that the operator intends to restart the engine, whereby the operator, even if unfamiliar with the system, can operate the machine without question, which allows the engine to be restarted smoothly.

Meanwhile, since the power supply is cut off automatically when the engine is stopped, it is possible to prevent unnecessary discharge in a construction machine in which a battery is used as a power supply.

In the case above, since the power supply is to be cut off after a constant time has passed since the engine is stopped, it is possible to ensure electrical treatments that should be performed when the engine is stopped (e.g. memory processing in a machine with a computer mounted thereon).

In addition, in order to allow the power supply to be recovered after the engine is stopped, it is only required that an operator gets on the machine, or the power supply is to be recovered on the confirmation, based on the flow, as mentioned above, in which the key switch is turned from the ON position back to the OFF position, and then to the ON position again, that the operator intends to restart the engine, which requires no burdensome procedure for recovering the power supply to be followed, resulting in a reduction in an operational burden of the operator and in no possibility that the power supply may be recovered unnecessarily.

Further, after the operating means has been brought into a non-working state, the engine is to be stopped automatically after the allowance time has passed and when the operator gets off the machine, that is, only when the operator does not intend to continue his/her work, whereby the engine is not to be stopped even when the work is stopped while, for example, the operator gives work instructions or confirms work contents outward from inside the cabin, and even when the operator gets off the machine temporarily to have a wash or make an configuration for a short time, under the condition that the operator is to get on the machine again during the allowance time.

Therefore, there is no fear that the engine may be stopped despite the intention of the operator, which allows the burden of restarting the engine after each stop to be removed.

In the case above, since the engine is operated at a lower speed (standby speed) during the allowance time, it is possible to reduce the waste of engine fuel.

What is claimed is:

1. A construction machine comprising an illuminating lamp, a hydraulic actuator driven by discharge oil from a hydraulic pump adapted to operate using an engine as a power source, access state detecting means for detecting an access state of getting-on or getting-off of an operator, and control means adapted to stop said engine automatically when said access state detecting means detects the getting-off of the operator, under a condition that said illuminating lamp is turned off.

2. The construction machine according to claim 1, further comprising operating means for operating said hydraulic actuator, and operation state detecting means for detecting whether or not said operating means is in a working state, wherein said control means is configured to stop said engine automatically after a preset allowance time has passed and when said access state detecting means detects the getting-off of the operator after said operation state detecting means has detected that said operating means is in a non-working state.

3. The construction machine according to claim 2, wherein said control means is configured to decelerate a speed of said engine down to a preset standby speed during said allowance time.

4. The construction machine according to claim 1, wherein a gate lever switch adapted to be operated by a gate lever for opening and closing a gateway is used as said access state detecting means, and wherein said control means is configured to determine the getting-off of the operator based on a signal from said gate lever switch when said gate lever is opened.

5. A construction machine comprising a hydraulic actuator driven by discharge oil from a hydraulic pump adapted to operate using an engine as a power source, access state detecting means for detecting an access state of getting-on or getting-off of an operator, and control means adapted to stop said engine automatically when said access state detecting means detects the getting-off of the operator, and to provide guidance for restarting said engine for an operator when said access state detecting means detects getting-on of the operator after said engine is stopped automatically.

6. A construction machine comprising a hydraulic actuator driven by discharge oil from a hydraulic pump adapted to operate using an engine as a power source, access state detecting means for detecting an access state of getting-on or getting-off of an operator, and control means adapted to stop said engine automatically when said access state detecting means detects the getting-off of the operator, and to provide guidance for restarting said engine for the operator when a key switch for starting said engine is operated from an ON position to another position after said engine is stopped automatically.

7. A construction machine including a hydraulic actuator, comprising:
- a hydraulic actuator driven by discharge oil from a hydraulic pump adapted to operate using an engine as a power source;
- access state detecting means for detecting an access state of getting-on or getting-off of an operator;
- operating means for operating said hydraulic actuator;
- operation state detecting means for detecting whether or not said operating means is in a working state; and
- control means for stopping said engine automatically at a time after a preset allowance time has passed after said operation state detecting means has detected that said operating means is in a non-working state, and said access state detecting means detects the getting-off of the operator at said time after a preset allowance time has passed.

* * * * *